United States Patent [19]
Gress et al.

[11] Patent Number: 4,811,639
[45] Date of Patent: Mar. 14, 1989

[54] DRIVE BAR ATTACHMENT FOR THREADING MACHINES

[75] Inventors: Paul W. Gress, Bay Village; Paul E. Wesebaum, Elyria, both of Ohio

[73] Assignee: Emerson Electric Co., St. Louis, Mo.

[21] Appl. No.: 158,889

[22] Filed: Feb. 22, 1988

[51] Int. Cl.$^4$ .............................................. B23B 1/00
[52] U.S. Cl. .................................... 82/110; 82/152; 82/169; 279/1 A; 279/1 C; 279/2 R
[58] Field of Search ............... 82/34 R, 40 R, 43, 44, 82/DIG. 6, 5, 4 R, 4 C, 28 R, 28 A, 29 B, 29 R, 30; 279/1 A, 1 B, 1 C, 2 R

[56] References Cited

U.S. PATENT DOCUMENTS

| | | | |
|---|---|---|---|
| 775,579 | 11/1904 | Rich | 82/44 |
| 1,215,785 | 2/1917 | Everoad | 82/44 |
| 2,242,991 | 5/1941 | Carz | 82/44 |
| 2,890,888 | 6/1959 | Damijonaitis | 279/35 |
| 2,916,290 | 12/1959 | Skilain | 279/106 |
| 3,127,186 | 3/1964 | Van Rensser | 82/44 |
| 3,232,629 | 2/1966 | Obear | 279/106 |
| 3,270,592 | 9/1966 | Behnke | 279/106 |

Primary Examiner—Frederick R. Schmidt
Assistant Examiner—Blynn Shideler
Attorney, Agent, or Firm—Body, Vickers & Daniels

[57] ABSTRACT

An attachment is disclosed for use with a power driven threading machine of the character having a tubular workpiece receiving spindle carrying jaw assemblies which engage and disengage a workpiece in the spindle. During a threading operation, the jaws engage a workpiece and thereafter rotate the workpiece and spindle in one direction about the spindle axis. When the jaws are displaced to release the workpiece, the jaws and spindle are rotated in the opposite direction about the spindle axis. The disclosed attachment is adapted to be received in the threading machine spindle in place of a workpiece to provide a driving coupling such as for an auxiliary tool assembly supported on the threading machine. The attachment is provided with a head which is adapted to be engaged by the jaws to drive the attachment in a direction corresponding to the workpiece threading direction, and the attachment is provided with a one-way torsion spring clutch adapted to engage the interior of the spindle such that the attachment is rotated in the opposite direction when the jaws move out of engagement with the attachment and so drive the spindle. The outer end of the attachment is provided with a coupling arrangement by which the auxiliary tooling can be driven in opposite directions by the attachment.

18 Claims, 4 Drawing Sheets

DRIVE BAR ATTACHMENT FOR THREADING MACHINES

BACKGROUND OF THE INVENTION

The present invention relates to the art of power driven threading machines and, more paticularly, to an attachment adapted to be associated with the machine spindle to provide a power output for driving an auxiliary tool or the like.

Power driven thread cutting machines are of course well known and basically comprise a rotatable chuck assembly for supporting and rotating a workpiece, a tool carriage supporting tools for performing work on the rotating workpiece, and a drive unit for rotating the chuck assembly and thus the workpiece. The chuck assembly generally includes a tubular spindle having an axisof rotation and axially opposite ends, and a plurality of workpiece engaging jaw members supported at opposite ends of the spindle for displacement radially inwardly and outwardly of the spindle axis between closed and opened positions with respect to a workpiece introduced into the spindle. The jaw members on the spindle provide for a workpiece to be gripped at axially spaced apart locations along the length thereof and, in the closed positions of the jaws, the workpiece is held in a centered position coaxial with the spindle. A drive unit is provided for the chuck assembly and, in connection with initiating operation of the threading machine, the jaws are generally pivoted relative to the spindle and into engagement with a workpiece positioned in the spindle, after which the workpiece and chuck assembly are driven together by the drive unit through the jaws. Upon completion of a cutting, reaming and/or threading operation, the direction of the drive is reversed, whereby the jaws move outwardly of the spindle axis to release the workpiece. When the direction of the drive is reversed, the spindle and jaws are capable of being driven as a unit in the reverse direction.

Threading machine spindle and jaw assemblies operable in the foregoing manner are shown, for example in U.S. Pat. Nos. 2,916,290 to Skillin, 3,232,629 to Obear, 3,270,492 to Behnke and 2,890,888 to Damijonaitis, and in copending application Ser. No. 123,719 of James C. Redman filed Nov. 23, 1987 and assigned to the same assignee as the present invention, the disclosure of which application is incorporated herein by reference.

Heretofore, operation of the drive unit in the reverse direction had no utility other than achieving release of the jaws from the workpiece to facilitate removal of the workpiece from the spindle following a cutting, reaming and/or threading operation.

SUMMARY OF THE INVENTION

In accordance with the present invention, an attachment is provided for a power driven threading machine of the foregoing character which advantageously provides a power take-off from the machine which is operable in both of the directions of rotation of the jaws and spindle and thus enables the driving of an accessory or the like which requires a reversible drive in connection with its operation. More particularly in this respect, the attachment is adapted to be received in the threading machine spindle so as to be grasped and driven by the jaws and spindle when the drive unit operates in one direction and which clutchingly interengages with the spindle when the jaws are in the open positions thereof so that the attachment is driven in the reverse direction by the spindle. The end of the attachment adjacent the threading machine jaws is provided with an arrangement for coupling the attachment to an accessory, whereby the latter is driven in opposite directions by the attachment. Such an accessory may, for example, be a thread cutting device supported on the tool carriage of the thread cutting machine for cutting threads on workpieces of larger diameter than that which can be accommodated in the spindle of the thread cutting machine. Absent the attachment according to the present invention, such an accessory would require association with a drive arrangement separate from the threading machine in order to achieve driving of the accessory in opposite directions. Such a requirement obviously increases the amount of equipment required by a workman at a work site as well as the amount of equipment which has to be transported to and from the work site.

It is accordingly an outstanding object of the present invention to provide an attachment for a power driven threading machine of the character having a spindle and jaws and which attachment is receivable in the spindle so as to be driven by the jaws in one direction of power input and to be driven by the spindle in the opposite direction of power input.

Another object is the provision of an attachment of the foregoing character having clutching interengagement with the threading machine spindle in response to rotation of the latter in the opposite direction.

A further object is the provision of an attachment of the foregoing character which optimizes utility and versatility of a power driven pipe threading machine with which it is adapted to be associated.

Still a further object is the provision of an attachment of the foregoing character which facilitates the operation of accessory equipment without having to provide a separate drive for such accessories.

Still another object is the provision of an attachment of the foregoing character which is structurally simple, readily installed and removed relative to the threading machine spindle, and efficient in connection with providing the threading machine with a power take-off rotatable in opposite directions.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawing in which.

DESCRIPTION OF THE PREFERRED EMBODIMENT

Referring now in greater detail to the drawings wherein the showings are for the purpose of illustrating a preferred embodiment of the invention only and not for the purpose of limiting the invention, FIG. 1 somewhat schematically illustrates a power driven threading machine with which an attachment according to the present invention can be used as will become apparent hereinafter. The structural details of the threading machine are not important in connection with understanding the present invention, and the structural interrelationship between the attachment and any power driven threading machine with which it can be used will be understood from the description herein including the following description of the major component parts of the threading machine shown in FIGS. 1 and 2. A detailed description of the structure and operation of this particular power driven threading machine is set forth in copending application Ser. No. 123,719 referred to hereinabove.

Figure 1:
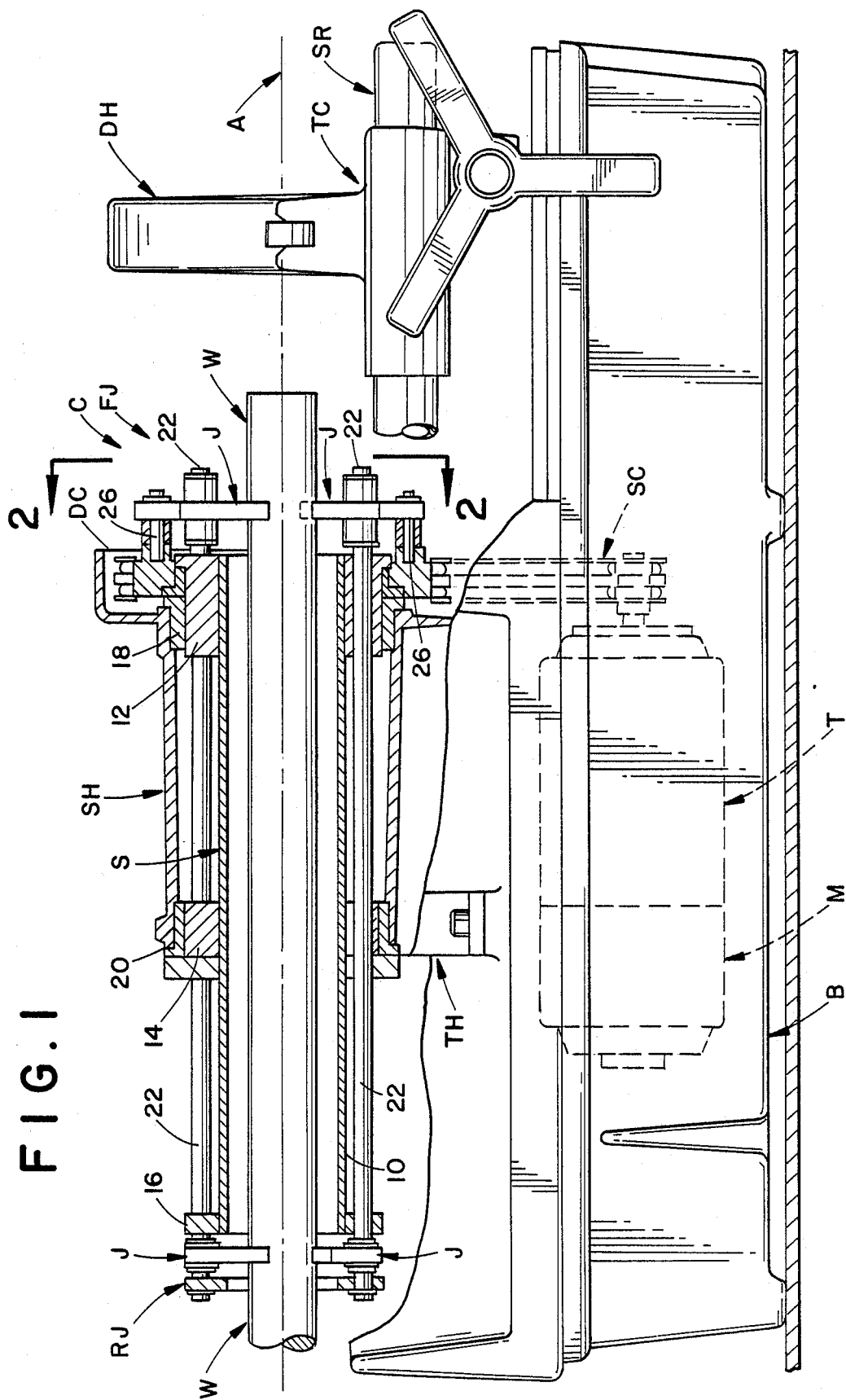
FIG. 1 is a side elevation view, partially in section, of a power driven threading machine of the character with which the attachment of the present invention is adapted to be used.
Figure 2:
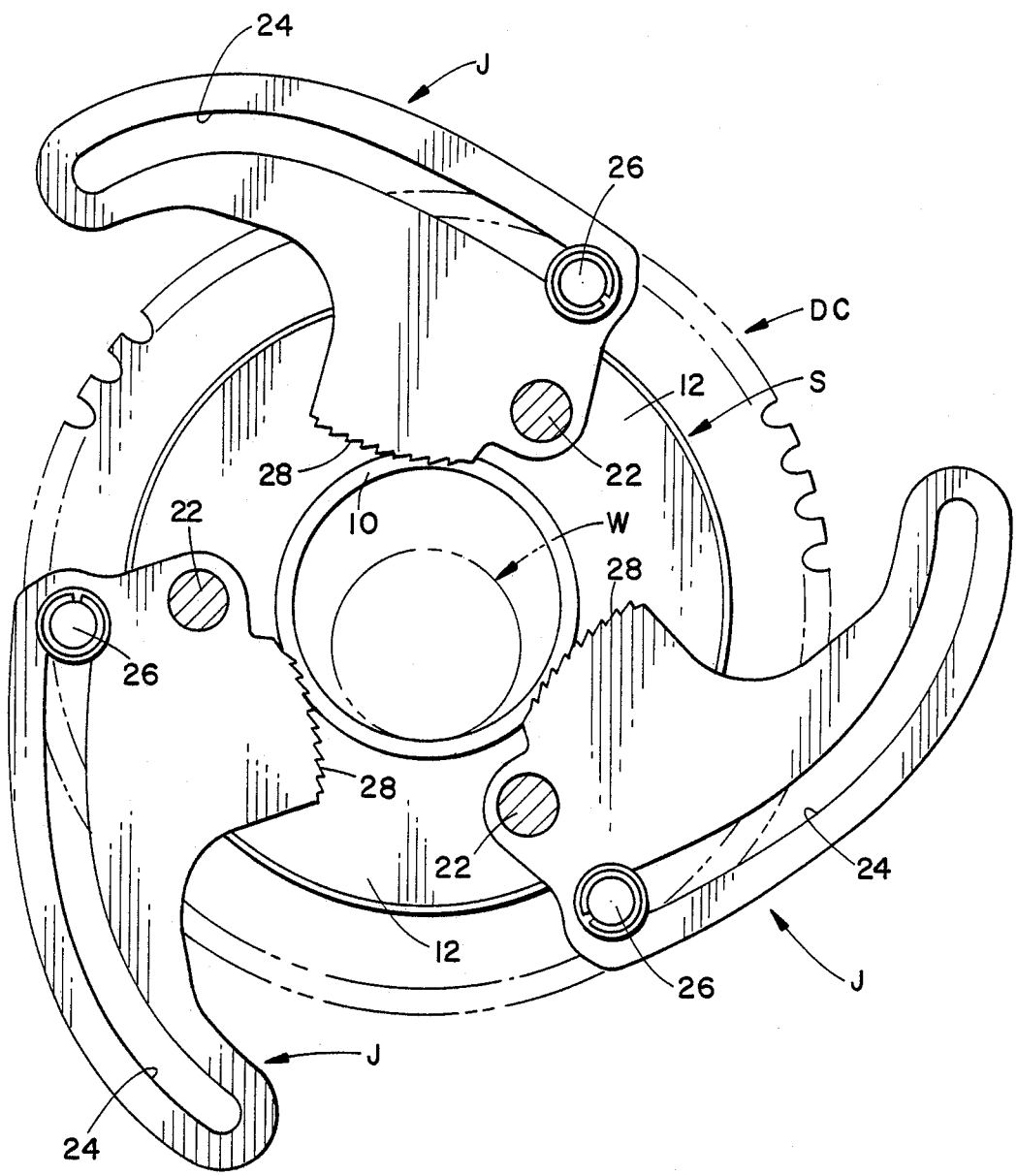
FIG. 2 is a sectional front end elevation view of the chuck assembly of the threading machine taken along line 2—2 in FIG. 1 and showing the chuck jaws in the open positions thereof.

With reference now to FIGS. 1 and 2, the power driven threading machine comprises a chuck assembly C rotatably supported by a spindle housing SH which is mounted on the upper end of a transmission housing TH which in turn is supported on a machine frame or base B. Chuck assembly C includes a tubular spindle S rotatably supported in spindle housing SH and provided at its front and rear ends with front and rear jaw units FJ and RJ, respectively, which are rotatable with the spindle and adapted to grippingly engage, support and rotate a workpiece W such as a pipe to be threaded. For this purpose, spindle S supports a jaw actuating and chuck drive collar DC which is adapted to be driven such as by a sprocket chain SC which, in turn, is driven by a motor M through a speed transmission T.

Spindle housing SH is provided along its laterally opposite sides with tubular openings receiving corresponding support rods SR which, in a well known manner, are adapted to support a tool carriage TC which carries a thread cutting die head unit as schematically shown in FIG. 1 and designated DH. As is further well known, tool carriage TC is adapted to be moved axially along support side SR toward and away from the front end of the chuck assembly and the corresponding end of workpiece W, whereby the die head is adapted to thread the workpiece end during rotation of the chuck assembly and workpiece about the chuck or machine axis A with which the die head is coaxially positioned.

More particularly with regard to the spindle and jaw unit assembly, spindle S is comprised of a spindle tube 10 having annular collars 12, 14 and 16 secured thereto, and the spindle assembly is rotatably supported in spindle housing SH by annular bearings 18 and 20 respectively interposed between collars 12 and 14 and the spindle housing. The jaw units, as will be appreciated from FIG. 2 showing front jaw unit FJ, are each comprised of a plurality of jaw members J pivotally mounted on the spindle collars by means of corresponding rods 22. Rods 22 are pivotal relative to the spindle collars, and jaws J are suitably secured to the rods for pivotal movement therewith. Each jaw J includes a cam slot 24 receiving a corresponding pin 26 mounted on drive collar DC, and each of the jaws includes a serrated inner end 28 for engaging workpiece W during a working operation. When the jaws are in the open positions shown in FIG. 2, counterclockwise rotation of drive collar DC displaces pins 26 counterclockwise along slots 24, whereby jaws J pivot counterclockwise about the axis of rods 22. Such displacement of the jaws moves serrated edges 28 radially inwardly of axis A, whereby the serrated edges engage and support workpiece W coaxial with axis A to provide the closed position of the jaws relative to the workpiece. It will be appreciated that continued counterclockwise rotation of drive collar C provides for the spindle assembly, jaws and workpiece W to be rotated about axis A through pins 26. During such rotation of the workpiece, a threading or other tooling operation is performed thereon by the tooling supported on the machine carriage. Upon rotation of drive collar DC clockwise in FIG. 2 from the workpiece supporting and driving position, it will be appreciated that pins 26 move clockwise along slots 24 thereby pivoting jaws J clockwise about the axes of rods 22 to the open positions of the jaw in which the latter clear the inner surface of spindle tube 10 and thus workpiece W, as shown in FIG. 2, whereby the workpiece can be withdrawn from the spindle. As will be further appreciated from FIG. 2, continued clockwise rotation of drive collar DC would result in rotation of spindle tube 10 through the spindle collars, pivot rods 22 and engagement of drive pins 26 with the corresponding ends of slots 24.

Figure 3:
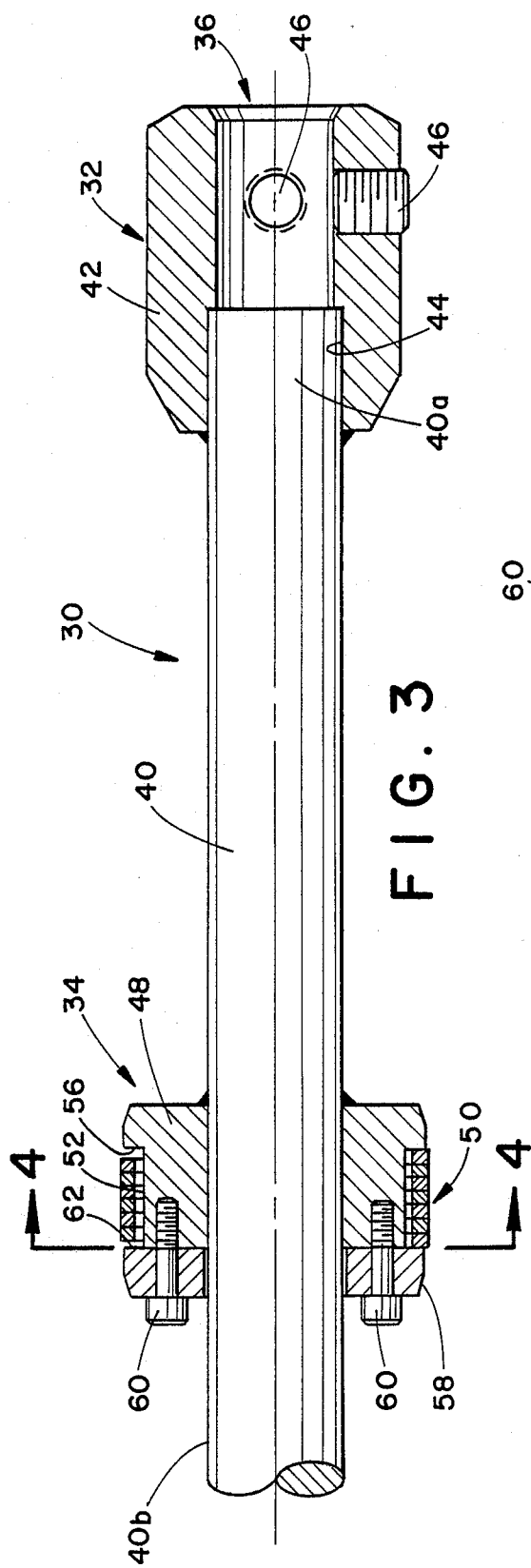
FIG. 3 is a sectional elevation view of an attachment according to the present invention.
Figure 4:
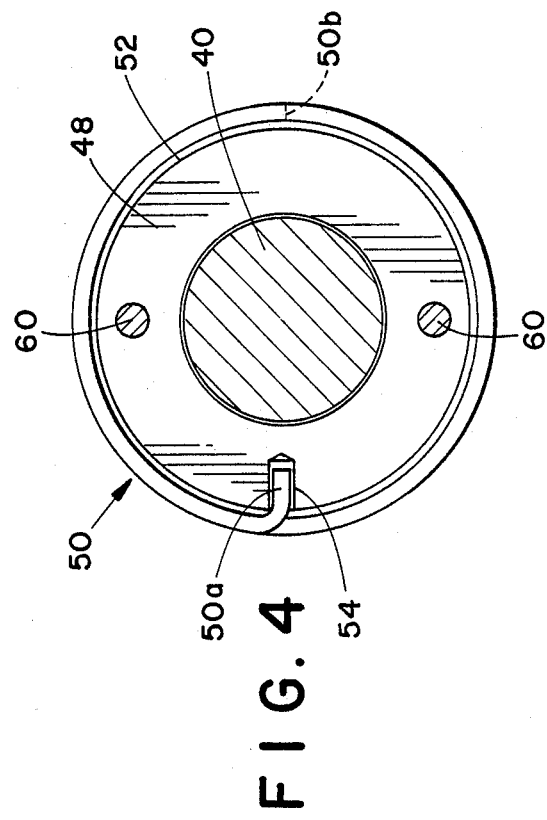
FIG. 4 is a cross-sectional elevation view of the attachment taken along line 4—4 in FIG. 3; and, FIG. 5 is a side elevation view, partially in section, of a portion of the threading machine shown in FIG. 1 and illustrating the attachment in mounted relationship therewith for driving an accessory supported on the tool carriage of the machine.
Figure 5:
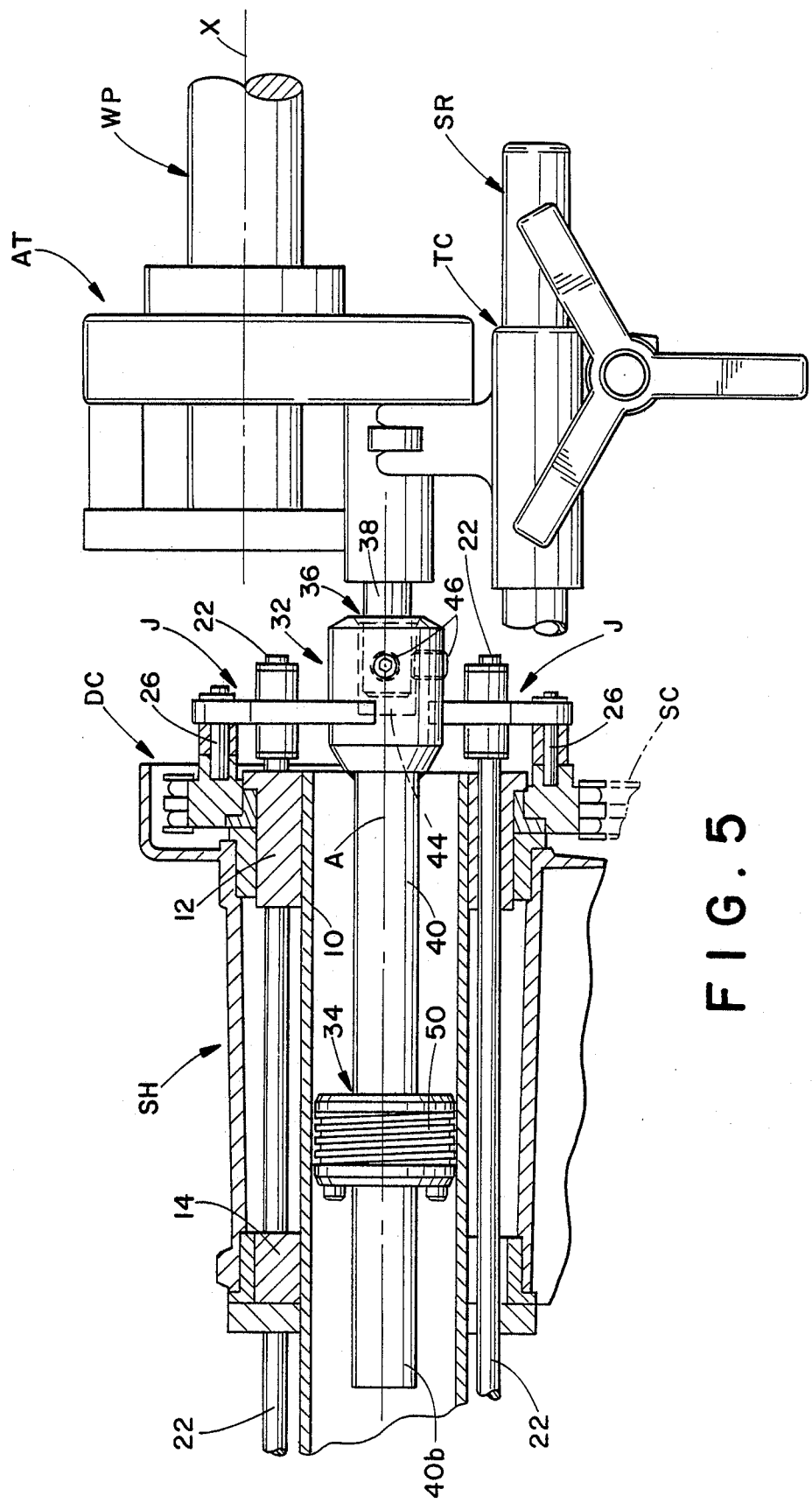

In accordance with the present invention, advantage is taken of such rotation of the spindle unit by providing an attachment receivable in the spindle tube in place of a workpiece and which is usable as a power output coupling rotatable in opposite directions by the threading machine drive unit. As best seen in FIGS. 3-5 of the drawing, the attachment 30 is receivable in spindle tube 10 coaxial with axis A and has an outer end 32 adapted to be engaged by the threading machine jaws when the latter are in the closed positions thereof so that the haws, drive collar and drive pins rotate the attachment and spindle S in the same manner as a workpiece in the spindle is rotated. The attachment further includes a one-way clutch 34 spaced axially inwardly from outer end 32 and which, as will become apparent hereinafter, clutchingly interengages with spindle tube 10 in response to the rotation of spindle tube 10 in the opposite direction following displacement of the jaw members to the open positions thereof as described above.

Outer end 32 of attachment 30 is provided with a coupling arrangement 36 which, as will be appreciated from FIG. 5, facilitates connecting the attachment to a drive member 38 of an auxiliary tool At supported on the machine tool carriage TC. In the embodiment illustrated, the auxiliary tool is a geared type threading device for threading the end of a workpiece WP which is disposed on an axis X offset from axis A of the threading machine and thus the axis of drive member 38 of the auxiliary tool. As is well known in the pipe threading art, such a geared pipe threader comprises a rotatable thread cutting die head supported for rotation about axis X and driven through an externally toothed drive gear which is driven by a pinion coaxial with drive member 38. As is further well known, rotation of drive member 38 in one direction provides for advancing the die head and cutting a thread on the end of the workpiece WP, and rotation of the drive member in the opposite direction provides for backing the thread cutting die head off of the threaded end when threading is completed.

In the preferred embodiment illustrated, attachment 30 comprises a steel rod 40 which is circular in cross-section, and outer end 32 of the attachment is provided by a tubular sleeve or head member 42 of steel having a cylindrical bore 44 therethrough receiving outer end 40a of rod 40. Preferably, sleeve 42 is welded to rod 40, although it will be appreciated that it could be otherwise secured thereto such as by a shrink fit or suitable pin connection. End 40a of rod 40 extends part way through bore 44, and the axially outer end of the bore together with set screws 46 define the coupling arrangement in the preferred embodiment. In this respect, the outer end of bore 44 is adapted to receive a drive member with which the attachment is to be coupled, such as drive member 38 of geared threader AT, and the drive member is adapted to be secured to the attachment for rotation therewith by set screws 46 which preferably extend radially through the wall of the sleeve in locations spaced 90° apart from one another. It will be appreciated, of course, that a wide variety of coupling arrangements could be devised to provide the function of drivingly connecting the attachment to auxiliary tooling or the like to be driven thereby.

Clutch 34 is preferably provided by a torsion clutch spring arrangement which operates in a well known manner to allow relative rotation between two parts in one direction and to preclude such relative rotation in the opposite direction so as to provide a driving connection therebetween in the latter direction. In the embodiment illustrated, clutch 34 comprises a collar member 48 received on rod 40 and secured thereto such as by welding at a location therealong between sleeve 42 and inner end 40b of the rod. Collar 48 supports a clutch spring 50 and, in this respect, includes a circular outer surface 52 about which the convolutions of spring 50 extend, and a radially inwardly extending recess 54 receiving one end 50a of spring 50. The other end 50b of spring 50 terminates at a point along surface 52 and is not attached to the collar. Spring 50 is axially captured on collar 48 by means of a shoulder 56 at one end of surface 52 and a retaining plate member 58 attached to collar 48 at the other end of surface 52. Plate member 58 is secured to collar 48 by threaded fasteners 60 and provides a retaining flange or shoulder 62 at the corresponding end of surface 52. While collar 48 is preferably welded on rod 40, it will be appreciated that it can be otherwise secured thereto such as by a shrink fit or a suitable pin connection. Moreover, it will be appreciated that the collar member and head member could be machined or cast integral with a body portion of the attachment corresponding to rod 40.

It will be understood, of course, that the outer surface of the convolutions of spring 50 frictionally interengage with the inner surface of spindle tube 10 and that rotation of the attachment relative to the spindle tube and in the counterclockwise direction as seen in FIG. 4 constricts the spring relative to surface 52 of collar 48 to facilitate introduction of the attachment into the spindle tube. Once positioned in the spindle tube for sleeve 42 to be in alignment with the jaw members, auxiliary tool AT can be positioned for drive member 48 to be received in the outer end of bore 44 and secured thereto by set screws 46. Thereafter, rotation of drive collar DC counterclockwise in FIG. 2 displaces jaws J to their closed position engaging sleeve 42 so as to rotate the attachment and thus drive member 38 of the auxiliary tool in the corresponding direction. Rotation of drive collar DC clockwise in FIG. 2 displaces jaws J outwardly to the open positions thereof in which the jaws disengage sleeve 42, and continued rotation of the drive collar in the clockwise direction results in clockwise rotation of spindle tube 10 as described hereinabove. As will be appreciated from FIG. 4 of the drawing wherein such clockwise rotation in FIG. 2 would be counterclockwise rotation of spindle tube 10 relative to spring 50, the frictional engagement between spindle tube 10 and the outer surface of spring 50 expands the spring clutch against the spindle tube whereby the attachment is driven by the spindle tube in the direction opposite that of the drive provided by the jaw members.

While considerable emphasis has been placed herein on the preferred embodiment of the attachment, it will be appreciated that many changes can be made in the preferred embodiment without departing from the principles of the invention. In this respect, for example, other one-way clutch arrangements could be devised for providing the desired clutching interengagement between the spindle tube and attachment, and other arrangements can be provided on the outer end of the attachment in place of or in addition to the bore and set screw arrangement for coupling the latter end of the attachment to a device to be driven thereby. In this respect, it will be appreciated that the outer end of the attachment provides a power rotatable in opposite directions relative to the threading machine axis and, therefore, could be used for any desired auxiliary drive purpose. By way of example, the outer surface of sleeve 42 could be splined for axial interengagement with a component to be driven, could be provided with gear teeth for coupling with a gear to be driven, or could be provided with a cam profile to provide a cam-type output drive. Further, in connection with the preferred embodiment, bore 44 could be non-circular in configuration for receiving a correspondingly contoured drive member, thus eliminating the need for set screws to preclude relative rotation between the attachment and such drive member. These and other modifications will be obvious and suggested to those skilled in the art from the preferred embodiment described herein. Accordingly, it is to be distinctly understood that the foregoing descriptive matter is to be interpreted merely as illustrative of the invention and not as a limitation.

Having thus described the invention it is claimed:

1. In combination, a power driven threading machine of the character having rotatable tubular spindle means for receiving a workpiece and having a spindle axis and axially opposite ends, jaw means supported on said spindle means adjacent one of said ends for rotation therewith about said spindle axis and for displacement radially inwardly and outwardly of said spindle axis respectively into workpiece gripping and workpiece releasing positions relative to a workpiece in said spindle means, drive means for displacing said jaw means between said positions thereof, said drive means and jaw means in said workpiece gripping and releasing positions respectively rotating said workpiece and spindle means in one direction about said spindle axis and rotating said spindle means in the opposite direction about said spindle axis, and an attachment comprising support means receivable in said spindle means coaxial with said spindle axis and having outer end means engaged by said jaw means in said workpiece gripping position thereof for said drive means and jaw means to rotate said attachment and spindle means in said one direction, clutch means on said support means having clutching engagement with said spindle means when said drive means and jaw member means rotate said spindle means in said opposite direction whereby said spindle means rotates said attachment in said opposite direction, and said outer end means including power output coupling means.

2. The combination according to claim 1, wherein said coupling means includes an opening coaxial with said spindle axia and extending axially into said outer end means.

3. The combination according to claim 2, wherein said opening is circular and said coupling means further includes threaded fastener means extending radially through said outer end means into said opening.

4. The combination according to claim 1, wherein said spindle means has a circular inner surface and said clutch means includes spring means having a biasing force toward said surface which is greater when said spindle means rotates in said opposite direction than when said spindle means rotates in said one direction.

5. The combination according to claim 4, wherein said spring means includes a helical spring member having convolutions surrounding said support means and engaging said inner surface, said spring member having a first end attached to said support means and a second free end, said first and second ends being oriented relative to said outer end means for said convolutions to radially expand relative to said inner surface in response to rotation of said spindle means in said opposite direction.

6. The combination according to claim 1, wherein said spindle means has a circular inner surface and said clutch means includes clutch member means frictionally interengaging with said surface to restrain relative rotation between said spindle means and said attachment in response to rotation of said spindle means in said opposite direction.

7. The combination according to claim 6, wherein said clutch member means includes torsion spring means mounted on said support means so as to radially expand against said inner surface in response to rotation of said spindle means in said opposite direction.

8. The combination according to claim 6, wherein said coupling means includes an opening coaxial with said spindle axis and extending axially into said outer end means.

9. The combination according to claim 8, wherein said clutch member means includes torsion spring means mounted on said support means so as to radially expand against said inner surface in response to rotation of said spindle means in said opposite direction.

10. The combination according to claim 9, wherein said opening is circular and said coupling means further includes threaded fastener means extending radially through said outer end means into said opening.

11. In combination, a power driven threading machine of the character having rotatable tubular spindle means for receiving a workpiece, said spindle means having an inner surface, a spindle axis and axially opposite ends, jaw means supported on said spindle means adjacent one of said ends for rotation therewith about said spindle axis and for displacement radially inwardly and outwardly of said spindle axis respectively into workpiece gripping and workpiece releasing positions relative to a workpiece in said spindle means, drive means for displacing said jaw means between said positions thereof, said drive means and jaw means in said workpiece gripping and releasing positions respectively rotating said workpiece and spindle means in one direction about said spindle axis and rotating said spindle means in the opposite direction about said spindle axis, and an attachment receivable in said one end of said spindle means coaxial with said spindle axis and comprising rod means having outer and inner ends, head means on said outer end of said rod means engaged by said jaw means in said workpiece gripping position thereof for said drive means and jaw means to rotate said attachment and spindle means in said one direction, collar means on said rod means between said head means and said inner end, said collar means including radially outer surface means spaced radially inwardly from said inner surface of said spindle means, and clutch means between said outer surface means of said collar means and said inner surface of said spindle means, said clutch means having clutching engagement with said inner surface of said spindle means when said drive means and jaw member means rotate said spindle means in said opposite direction whereby said spindle means rotates said attachment in said opposite drection, and said head means including power output coupling means.

12. The combination according to claim 11, wherein said head means includes a tubular head member mounted on said rod means, said head member having axially inner and outer ends, said inner end of said head member receiving said outer end of said rod means such that said outer end of said rod means terminates between said ends of said head member, said coupling means including the part of the interior of said head member between said outer ends of said rod means and head member.

13. The combination according to claim 12, wherein said coupling means further includes threaded fastener means extending radially through said head member and into said part of the interior thereof.

14. The combination according to claim 11, wherein said clutch means includes torsion spring means mounted on said collar means so as to radially expand against said inner surface of said spindle means in response to rotation of said spindle means in said opposite direction.

15. The combination according to claim 14, wherein said collar means includes a circular outer surface having axially opposite ends and providing said radially outer surface menas, said torsion spring means including at least one convolution surrounding said circular outer surface between said ends thereof and having a first end attached to said collar means and a second free end, and said collar means further including means to axially retain said torsion spring means on said outer surface.

16. The combination according to claim 15, wherein said collar means includes collar member means mounted on said rod means, said collar member means including said circular outer surface and integral spring retaining means at one of said opposite ends thereof, and said collar means further including retaining plate means removably attached to said collar member means at the other of said opposite ends of said outer surface.

17. The combination according to claim 16, wherein said head means incudes a tubular head member mounted on said rod means, said head member having axially inner and outer ends, said inner end of said head member receiving said outer end of said rod means such that said outer end of said rod means terminates between said ends of said head member, said coupling means including the part of the interior of said head member between said outer ends of said rod means and head member.

18. The combination according to claim 17, wherein said coupling means further includes threaded fastener means extending radially through said head member and into said part of the interior thereof.

* * * * *

UNITED STATES PATENT AND TRADEMARK OFFICE
CERTIFICATE OF CORRECTION

PATENT NO. : 4,811,639

DATED : March 14, 1989

INVENTOR(S) : Paul W. Gress and Paul E. Wesebaum

It is certified that error appears in the above-identified patent and that said Letters Patent is hereby corrected as shown below:

Column 4, line 37, change "haws" to --- jaws ---. Column 7, line 6, change "axia" to --- axis ---. Column 8, line 41, change "menas" to --- means ---; line 56, change "incudes" to --- includes ---.

Signed and Sealed this

Third Day of April, 1990

Attest:

HARRY F. MANBECK, JR.

*Attesting Officer*      *Commissioner of Patents and Trademarks*